(12) United States Patent
Abouseif et al.

(10) Patent No.: US 11,916,597 B2
(45) Date of Patent: Feb. 27, 2024

(54) METHODS AND DEVICES FOR MULTI-CORE FIBER DATA TRANSMISSION USING DATA PRECODING

(71) Applicant: INSTITUT MINES-TELECOM, Palaiseau (FR)

(72) Inventors: Akram Abouseif, Paris (FR); Ghaya Rekaya, Antony (FR)

(73) Assignee: INSTITUT MINES TELECOM, Palaiseau (FR)

( * ) Notice: Subject to any disclaimer, the term of this patent is extended or adjusted under 35 U.S.C. 154(b) by 0 days.

(21) Appl. No.: 17/621,422

(22) PCT Filed: Jun. 23, 2020

(86) PCT No.: PCT/EP2020/067408
§ 371 (c)(1),
(2) Date: Dec. 21, 2021

(87) PCT Pub. No.: WO2021/008821
PCT Pub. Date: Jan. 21, 2021

(65) Prior Publication Data
US 2022/0376789 A1 Nov. 24, 2022

(30) Foreign Application Priority Data
Jul. 17, 2019 (EP) .................................... 19290058

(51) Int. Cl.
*H04B 10/2581* (2013.01)
(52) U.S. Cl.
CPC ... *H04B 10/2581* (2013.01); *H04B 2210/254* (2013.01)

(58) Field of Classification Search
CPC ............... H04B 10/2581; H04B 2210/254; H04J 14/04
(Continued)

(56) References Cited

U.S. PATENT DOCUMENTS 8,503,845 B2 * 8/2013 Winzer ............. H04B 10/2581
385/127
10,644,908 B2 * 5/2020 Xu .................. H04B 10/54
(Continued)

FOREIGN PATENT DOCUMENTS

EP 3 562 063 A1 10/2019
EP 3 562 064 A1 10/2019
(Continued)

OTHER PUBLICATIONS

Abouseif, et al., "Core Mode Scramblers for ML-detection based Multi-Core Fibers Transmission", Asia Communications and Photonics Conference, OSA Technical Digest, 2017.
(Continued)

*Primary Examiner* — Abbas H Alagheband
(74) *Attorney, Agent, or Firm* — Baker Hostetler

(57) ABSTRACT

An optical transmitter for transmitting a vector of information symbols over an optical fiber transmission channel made of a multi-core fiber, optical signals carrying the vector of information symbols propagating along the multi-core fiber according to two or more cores, wherein the optical transmitter includes a precoder configured to determine a precoding matrix depending on one or more fiber parameters associated with the multi-core fiber and to precode the vector of information symbols by multiplying the vector of information symbols by the precoding matrix.

9 Claims, 8 Drawing Sheets

(58) Field of Classification Search
USPC .......................................................... 398/200
See application file for complete search history.

(56) References Cited

U.S. PATENT DOCUMENTS

| | | | | |
|---|---|---|---|---|
| 2007/0053421 | A1* | 3/2007 | Srodzinksi | H04B 10/504 375/238 |
| 2012/0183304 | A1* | 7/2012 | Winzer | H04B 10/2581 398/142 |
| 2014/0314410 | A1* | 10/2014 | Mumtaz | H04J 14/06 398/76 |
| 2016/0337178 | A1* | 11/2016 | Frenne | H04L 41/0803 |
| 2017/0019178 | A1* | 1/2017 | Alic | H04B 10/2543 |
| 2017/0195052 | A1* | 7/2017 | Awwad | H04J 14/04 |
| 2019/0068413 | A1* | 2/2019 | Xu | H04B 10/6972 |

FOREIGN PATENT DOCUMENTS

| | | | | |
|---|---|---|---|---|
| EP | 3 562 065 | A1 | 10/2019 | |
| EP | 3 562 066 | A1 | 10/2019 | |
| EP | 3547572 | A1 * | 10/2019 | .............. H03M 7/40 |
| EP | 3562063 | A1 * | 10/2019 | ......... H04B 10/2507 |
| EP | 3562064 | A1 * | 10/2019 | ............... G02B 6/14 |
| EP | 3562065 | A1 * | 10/2019 | ......... H04B 10/0252 |
| EP | 3562066 | A1 * | 10/2019 | ......... H04B 10/2507 |
| EP | 3562063 | B1 * | 6/2022 | ......... H04B 10/2507 |

OTHER PUBLICATIONS

Abouseif, et al., "Deterministic Core Scrambling for Multi-Core Fiber Transmission System", The 23rd OptoElectronics and Communications Conference (OECC), Jul. 2018.

* cited by examiner

METHODS AND DEVICES FOR MULTI-CORE FIBER DATA TRANSMISSION USING DATA PRECODING

CROSS-REFERENCE TO RELATED APPLICATIONS

This application is a National Stage of International patent application PCT/EP2020/067408, filed on Jun. 23, 2020, which claims priority to foreign European patent application No. EP 19290058.7, filed on Jul. 17, 2019, the disclosures of which are incorporated by reference in their entirety.

TECHNICAL FIELD

The invention generally relates to optical communications and in particular to devices and methods for linear precoding in multi-core fibers.

BACKGROUND

Optical fibers are widely used in data transmission systems.

Optical fibers constitute optical waveguides that guide electromagnetic waves in the optical spectrum. Optical fibers include a transparent core surrounded by a transparent cladding material with a lower index of refraction. Light propagates in the fiber, following a succession of internal reflections. Light carries data and allows transmission over long distances at higher bandwidths than in wire-based or wireless communication systems.

The amount of the data traffic in optical communication networks has been exponentially expanded in accordance with the increase of Internet traffic. The transmission capacities and reach of optical communication systems using single-mode fibers has been increased since the practical use of wavelength division multiplexing (WDM), coherent detection and polarization division multiplexing (PDM) along with advanced signal processing.

However, WDM-PDM systems using conventional single mode fibers, with a small core radius where waves propagate along a single propagation mode, almost reached the non-linear capacity limit of optical transmission systems and cannot cope with the exponential growth in the demand for higher network bandwidth.

Space division multiplexing (SDM), performed using multi-mode fibers (MMFs) or multi-core fibers (MCFs), is the last degree of freedom to overcome the capacity limit of the current optical transmission systems and keep up with the exponential growth in the demand for network bandwidth. Space division multiplexing exploits the space in the fiber as a multiplexing dimension for the creation of a plurality of independent spatial channels over which independent data streams can be multiplexed and carried in the same fiber. Using SDM, the capacity can be multiplied by the number of independent spatial channels, thus increasing both the reach and the transmission capacities of optical fiber transmission links.

Multi-mode fibers allow the propagation of light according to many spatial propagation modes. The core of a multi-mode fiber is enlarged to allow the propagation of more than one spatial mode. The number of reflections created as the light passes through the core increases, creating the ability to propagate more data at a given time slot.

Multi-core fibers incorporate multiple identical or different cores in a single fiber, each core being single-mode or multi-mode. Multi-core fibers can be classified into uncoupled and coupled MCFs.

In uncoupled MCFs, each core has to be suitably arranged to keep the inter-core crosstalk sufficiently small for long distance transmission applications to detect signals from each core separately (i.e. no multiple-input multiple-output equalization is required at receiver). Several types of uncoupled multi-core fibers have been designed according to different core arrangements. These designs comprise 'homogeneous MCFs' and 'homogeneous with trench-assisted MCFs' incorporating multiple identical cores, and heterogeneous MCFs' incorporating multiple cores of several types.

In coupled MCFs, several cores are placed so that they strongly and/or weakly couple with each other. Coupled MCFs supporting a single spatial mode and multiple spatial modes can be used in high-power fiber laser applications.

Multi-core fibers are affected by several impairments due to the misalignment losses and crosstalk effects. The crosstalk and misalignment losses induce a core dependent loss (CDL). The CDL is an impairment effect similar to the MDL affecting multi-mode fibers.

The misalignment losses rise due to the imperfections of the optical fiber at the splices and connector part. Three types of misalignment losses exist comprising the longitudinal displacement losses, the transverse displacement losses, and angular displacement losses.

The crosstalk effect is due to the existence of multiple cores in one cladding which generates a crosstalk between the neighboring cores. The crosstalk increases with a smaller inter-core distance and represents the main limitation to the capacity in terms of the optical signal quality and the number of cores integrated inside a multi-core fiber. Further, low crosstalk effects enable a decoding complexity reduction at the optical receiver since no multiple-input multiple-output equalization is required for small crosstalk values Optical solutions can be applied during the manufacturing of the optical fibers in order to reduce the crosstalk effect.

A first approach consists in increasing the inter-core distance. This approach enables reducing the crosstalk effect. However it limits the number of cores inside the fiber due to the cladding diameter and consequently it decreases the core density and capacity.

A second approach is based on trench assistance with the use of trench-assisted homogeneous multi-core fibers. Trench assistance reduces the coupling coefficients by surrounding each core with a low-index trench layer. The crosstalk in trench-assisted fiber designs is independent of the inter-core distance.

A third solution uses heterogeneous MCFs in which an intrinsic index difference between neighbor cores is introduced, enabling reducing the crosstalk effect.

Further, optical solutions can be used during the design of the optical fiber transmission channel by installing core scramblers that average the losses in the different cores of the multicore fiber such that the average core dependent loss is reduced. Existing scrambling techniques include random core scrambling as disclosed in "A. Abouseif, G. R. Ben-Othman, and Y. Jaouen, Core Mode Scramblers for ML-detection based Multi-Core Fibers Transmission, in Asia Communications and Photonics Conference, OSA Technical Digest, 2017" and deterministic core scrambling disclosed in "A. Abouseif, G. Rekaya-Ben Othman and Y. Jaouën, "Deterministic Core Scrambling for Multi-Core Fiber Transmission", OECC, Jeju Island, Korea, July 2018".

Although existing optical solutions enable a reduction of the crosstalk in multi-core fibers, they cannot optimally mitigate the core dependent loss effects.

There is accordingly a need for developing low-complexity solutions that enhance the performance of multicore fiber-based transmission systems and reduce the effect of the core dependent losses.

SUMMARY

In order to address these and other problems, there is provided an optical transmitter for transmitting a vector of information symbols over an optical fiber transmission channel made of a multi-core fiber, optical signals carrying the vector of information symbols propagating along the multi-core fiber according to two or more cores, the optical transmitter comprising a precoder configured to determine a precoding matrix depending on one or more fiber parameters associated with the multi-core fiber and to precode the vector of information symbols by multiplying the vector of information symbols by the precoding matrix.

According to some embodiemnts, the precoder may be configured to determine a core loss value associated with each of the two or more cores depending on the fiber parameters and at least one misalignment loss value, each core loss value being a random variable of a lognormal distribution defined by a mean value and a variance value, the mean value and the variance value being dependent on the fiber parameters and the at least one misalignment loss value, the precoder being configured to:
- determine a normalization factor as the ratio between a number of the two or more cores and a sum of the core loss values associated with the two or more cores;
- determine, randomly, a first unitary matrix and a second unitary matrix;
- determine a diagonal matrix comprising diagonal components, the diagonal components being equal to the mean values of the random variables defining the core loss values associated with the two or more cores;
- determine an auxiliary matrix as the product between the square root of the normalization factor, the first unitary matrix, the diagonal matrix, and the second unitary matrix;
- determine the precoding matrix as the inverse of the auxiliary matrix.

According to some embodiments, the fiber parameters may comprise a fiber length, a number of cores corresponding to the number of said two or more cores, crosstalk coefficients, and coupling coefficients, each crosstalk coefficient representing a crosstalk between two cores in the multi-core fiber, each coupling coefficient representing a coupling between two cores in the multi-core fiber.

According to some embodiments, the misalignments loss values may represent a misalignment of the multi-core fiber chosen in a group comprising a longitudinal misalignment, a transverse alignment, and an angular alignment.

According to some embodiments, the precoder may be configured to determine each mean value of a core loss value associated with each core as the product between a first value and a second value, the first value corresponding to the mean of a lognormal random variable representing a total misalignment loss associated with each core, the second value corresponding to a total crosstalk coefficient associated with each core, the precoder being configured to determine the total crosstalk coefficient associated with a given core from the crosstalk coefficients representing the crosstalk between the given core and the cores of the multi-core fiber different from the given core, the precoder being further configured to determine the variance value of each core loss value associated with each core of the multi-core fiber as the product between the square of the total crosstalk coefficient associated with said each core and a third value corresponding to the variance of said lognormal random variable representing the total misalignment loss associated with each core.

According to some embodiemnts, the optical transmitter may further comprise:
- an error correcting code encoder configured to encode data into a codeword vector by applying at least one error correcting code, and
- a modulator configured to determine the vector of information symbols by applying a modulation scheme to the codeword vector.

There is also provided an optical receiver configured to receive and decode the optical signals carrying data transmitted by an optical transmitter according to any preceding feature.

There is also provided a method for transmitting a vector of information symbols over an optical fiber transmission channel made of a multi-core fiber, optical signals carrying the vector of information symbols propagating along the multi-core fiber according to two or more cores, the method comprising determining a precoding matrix depending on one or more fiber parameters associated with the multi-core fiber and precoding the vector of information symbols by multiplying the vector of information symbols by the determined precoding matrix.

According to some embodiments, the method may further comprise determining a core loss value associated with each of the two or more cores depending on fiber parameters and at least one misalignment loss value, each core loss value being a random variable of a lognormal distribution defined by a mean value and a variance value, the mean value and variance value being dependent on the fiber parameters and the at least one misalignment loss value, the method further comprising:
- determining a normalization factor as the ratio between a number of the two or more cores and a sum of the core loss values associated with the two or more cores;
- determining, randomly, a first unitary matrix and a second unitary matrix;
- determining a diagonal matrix comprising diagonal components, the diagonal components being equal to the mean values of the random variables defining the core loss values associated with the two or more cores;
- determining an auxiliary matrix as the product between the normalization factor, the first unitary matrix, the diagonal matrix, and the second unitary matrix;
- determining the precoding matrix as the inverse of said auxiliary matrix.

Advantageously, the linear precoding techniques according to the embodiments of the invention enable precoding transmitted information symbols with a reduced complexity without requiring any channel state information at the optical transmitter via feedback links.

Advantageously, the linear pre-compensation techniques according to the embodiments of the invention enable alleviating the decoding operation at the optical receiver without compromising the decoding error performance.

Advantageously, the optical transmission devices and methods according to the various embodiments of the invention enable enhancing the performance of multi-core fiber transmission systems.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention.

DETAILED DESCRIPTION

Figure 1:
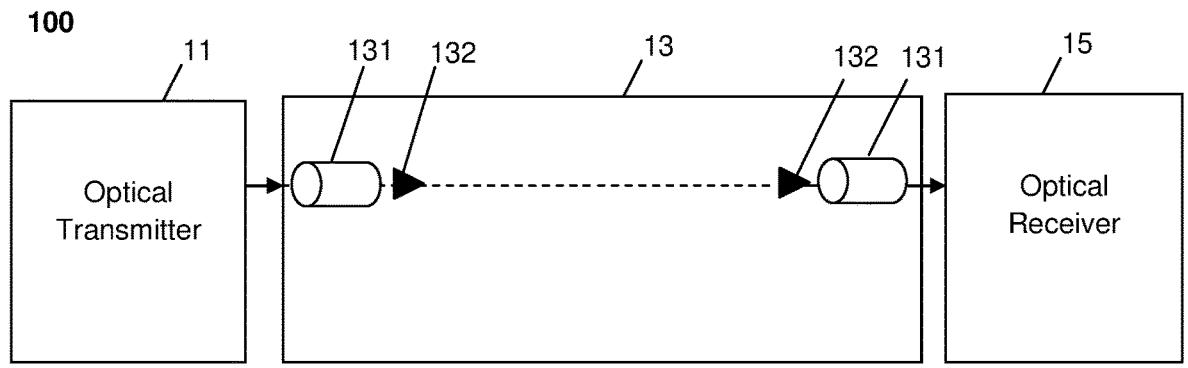
FIG. 1 illustrates a schematic diagram of an exemplary application of the invention in optical communication systems.

Embodiments of the present invention provide optical transmission devices and methods implementing linear precoding techniques that pre-compensate the optical fiber transmission channel without requiring feedback loops and perfect channel state information at the optical transmitter.

Devices and methods according to the various embodiments of the invention may be implemented in optical fiber transmission systems applied to a wide variety of applications. Exemplary applications comprise, without limitation, optical fiber communications, aerospace and avionics, data storage, automotive industry, imaging, transportation, sensing, and photonics.

Exemplary communication applications comprise desktop computers, terminals, and nationwide networks. Optical fibers may be used to transmit light and thus information/data over short distances (less than one meter) or long distances (up to hundreds or thousands of kilometers for example in communications over metropolitan networks, wide area networks, transoceanic links). Such applications may involve transfer of voice (e.g. in telephony), data (e.g. data supply to homes and offices known as fiber to the home), images or video (e.g. transfer of internet traffic), or connection of networks (e.g. connection of switches or routers and data center connectivity in high-speed local area networks).

In an exemplary implementation of the invention in the field of aerospace and avionics industries, optical fiber-based products may be used in military and/or commercial applications. Optical fiber technologies and products are designed in such applications to meet rigorous testing and certifications requirements in harsh environments and conditions.

In an exemplary implementation of the invention in data storage applications, optical fibers may be used in data storage equipments as a link between multiple devices in a network and/or as part of a storage system. Optical fiber connectivity offers very high bandwidth even over extended distances.

In another exemplary application of the invention to automotive industry applications, optical fiber technologies may be used for example in lighting/illumination, communications, and sensing for safety and control devices and systems.

In still another exemplary application of the invention to imaging applications (e.g. telemedicine), the optical transmission properties of the optical fibers may be used to transmit an image of a target or a subject area to the image view end for analysis and/or interpretation.

The invention may be used also in transportation systems, in which smart highways with intelligent traffic lights, automated tollbooths and changeable message signs may use telemetry systems based on optical fibers.

The invention may further be used in sensing applications, where optical fiber sensors may be used for sensing some quantities such as temperatures, displacements, vibrations, pressure, acceleration, rotations, and concentration of chemical species. Exemplary applications of optical fiber sensors comprise sensing in high voltage and high-power machinery or in microwaves, distributed temperature and strain measurements in buildings for remote monitoring (e.g. monitoring of the wings of airplanes, wind turbines, bridges, pipelines), downhole sensing in oil exploration applications, etc.

In another application of the invention to photonics, optical fibers may be used for connecting components in optical fiber devices, such as interferometers and fiber lasers. In such application, optical fibers play a similar role as electrical wires do in electronic devices.

The following description of certain embodiments will be made with reference to communication applications, for illustration purposes only. However, the skilled person will readily understand that the various embodiments of the invention may be applied to other types of systems for different applications.

FIG. 1 illustrates an exemplary implementation of the invention in an optical transmission system 100 (also referred to as 'optical communication system') based on optical fiber transmissions. The optical transmission system 100 comprises at least one optical transmitter device 11 (hereinafter referred to as an "optical transmitter") configured to encode an input data sequence into an optical signal and transmit the optical signal optically to at least one optical receiver device 15 (hereinafter referred to as an "optical receiver") through an optical fiber transmission channel 13 (hereinafter referred to as an 'optical fiber link') configured to transmit the light over some distance.

The optical communication system 100 may comprise computers and/or softwares to control the system operability.

The optical fiber transmission channel 13 comprises a multi-core fiber comprising a concatenation of a plurality of fiber sections 131 (also referred to as 'fiber span' or 'fiber slice'). The fiber sections 131 may be aligned or misaligned.

The multi-core fiber is a cylindrical non-linear waveguide consisting of two or more cores, a cladding surrounding the two or more cores, and a coating. Each core has a refractive index. The optical signal sent by the optical transmitter 11 is multiplexed and is guided in each core of the multi-core fiber through total internal reflections due to the difference between the refractive indices of the cores and the refractive index of the cladding.

In some embodiments in which the multi-core fiber is an uncoupled fiber, each core of the multi-core fiber may act as a separate waveguide such that the optical signal can be considered as propagating independently trough the cores.

In some embodiments in which the multi-core fiber is a coupled fiber, some coupling may exist between the cores if the distance between two cores is so small that the optical signals propagating along the different cores overlap.

The optical fiber may be made of glass (e.g. silica, quartz glass, fluoride glass), typically for long-distance transmissions. For short distance transmissions, the optical fiber may be a plastic optical fiber.

The multi-core fiber may be characterized by geometrical parameters and optical parameters. Geometrical parameters may comprise the cladding diameter, the core-to-core distance, and the core-outer cladding distance. Optical parameters may comprise the wavelength, the crosstalk coefficients representing the crosstalk between the different cores of the multi-core fiber, and the refractive index difference between each core and the cladding.

In some embodiments, the optical fiber communication system 100 may operate in a wavelength region corresponding to a region chosen in a group comprising:

the window of wavelengths ranging in 800-900 nm, suitable for short-distance transmissions;

the window of wavelengths around 1.3 μm, used for example for long-haul transmissions;

the window of wavelengths around 1.5 μm, more used since the losses of silica fibers are lowest in this wavelength region.

Figure 2:
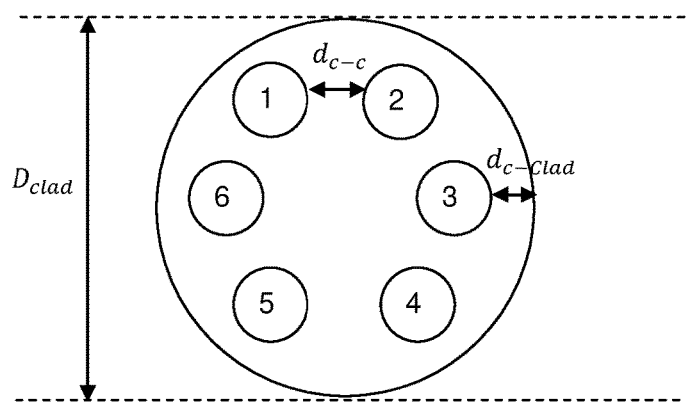
FIG. 2 illustrates a cross section view of an exemplary multi-core fiber.

FIG. 2 depicts a cross section of a six-cores fiber, $D_{clad}$ representing the cladding diameter, $d_{c-c}$ designating the inter-core distance, and $d_{c-clad}$ representing the core-outer cladding distance.

In some embodiments, the cores in the multi-core fiber may be arranged on a ring around the fiber axis for example on the edges of a hexagon. In other embodiments, the cores may be arranged on some 2-dimensional grid.

In an embodiment, the multi-core fiber may be a homogeneous multi-core fiber comprising two or more cores of identical types.

Figure 3:
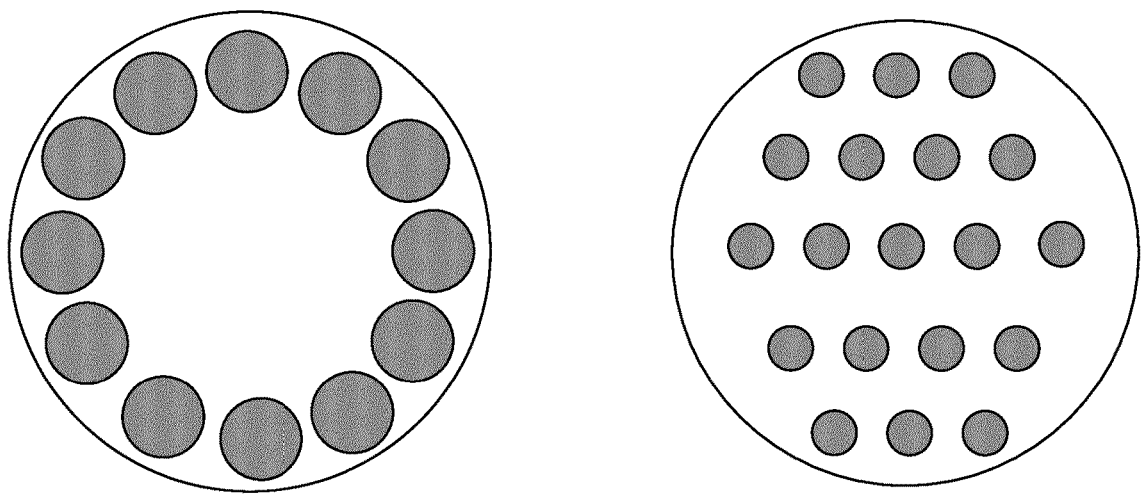
FIG. 3 depicts cross sections views of multi-core fibers, with a 12-cores homogeneous multi-core fiber comprising twelve cores arranged on a ring around the fiber axis and a 19-cores homogeneous fiber comprising nineteen cores arranged in a two-dimensional grid comprising a central core.

FIG. 3 depicts two cross sections of two exemplary homogeneous multi-core fibers, a first 12-cores fiber comprising 12 cores of identical types arranged on a ring around the fiber axis, and a second 19-cores fiber comprising 18 cores arranged on the edges of the hexagon and a central core.

In an embodiment, the multi-core fiber may be a homogeneous trench-assisted multi-core fiber, each core being surrounded by a low-index trench layer.

Figure 4:
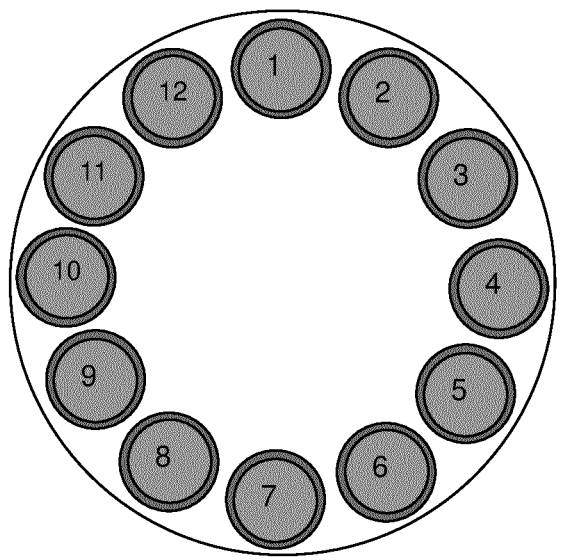
FIG. 4 depicts a cross section view of a multi-core fiber, according to some embodiments in which the multi-core fiber is a 12-cores homogeneous trench-assisted multi-core fiber.

FIG. 4 illustrates a cross section of an exemplary trench-assisted homogeneous multi-core fiber comprising 12 cores of identical types.

In another embodiment, the multi-core fiber may be a heterogeneous multi-core fiber comprising a plurality of cores among which at least two cores are of different types.

Figure 5:
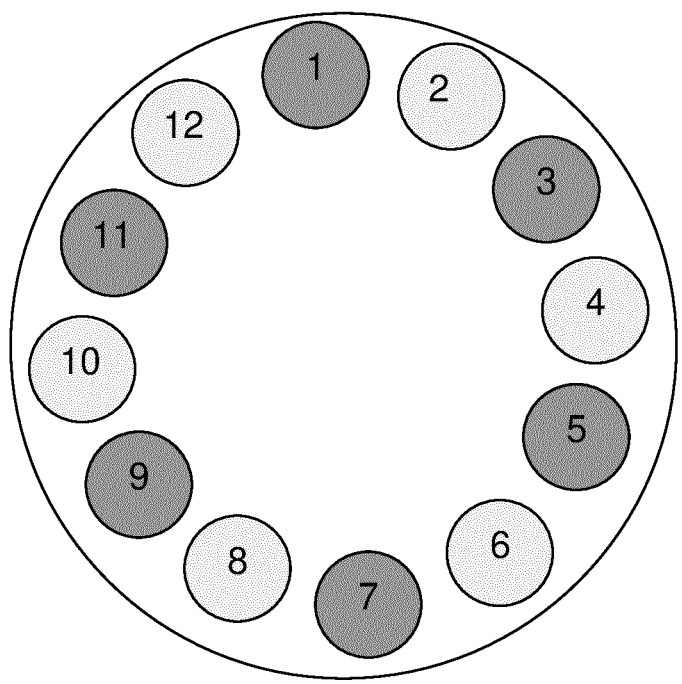
FIG. 5 illustrates a cross section view of a multi-core fiber, according to some embodiments in which the multi-core fiber is a 12-cores heterogeneous multi-core fiber comprising twelve cores arranged on a ring around the fiber axis.

FIG. 5 illustrates a cross section of an exemplary heterogeneous multi-core fiber comprising 12 cores among which cores numbered 2i+1 with i=0, . . . , 5 are identical, the cores numbered 2i+2 with i=0, . . . , 5 are identical, and the cores numbered 2i+1 are of a core type different from the core type of the cores numbered 2i+2 for i=0, . . . , 5. Each core in such heterogeneous multi-core fiber has two neighbors, each core having a core type different from the core type of its neighbor cores.

Figure 6:
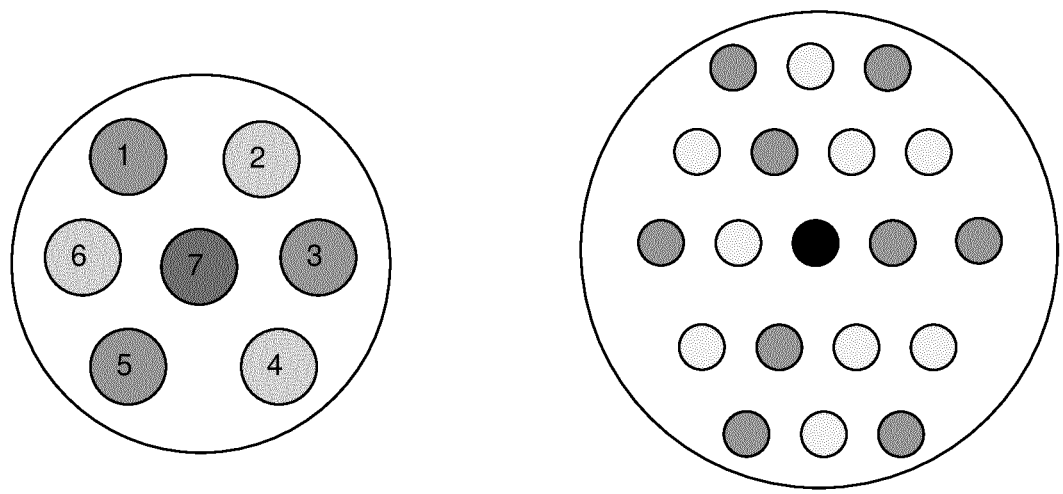
FIG. 6 illustrates cross sections views of multi-core fibers, with a 7-cores heterogeneous fiber comprising seven cores and a 19-cores heterogeneous fiber comprising three groups of cores, the cores of each the different groups having different types.

FIG. 6 illustrates the cross sections of two exemplary 7-cores fiber and 19-cores heterogeneous fibers. The 7-cores fiber comprises six cores on the edges of the hexagon numbered 1-6 and a central core numbered 7. Such 7-core fiber involves three different core types, the central core having a core type different from the types of the cores on the edges of the hexagon, and each core arranged on the edges of the hexagon having a core type different from the core type of its neighbor cores. The 19-cores fiber comprises three different core types, the central core having a core type different from the types of the cores on the edges of the hexagon.

In an embodiment, the multi-core fiber may be a trench-assisted heterogeneous multi-core fiber.

Figure 7:
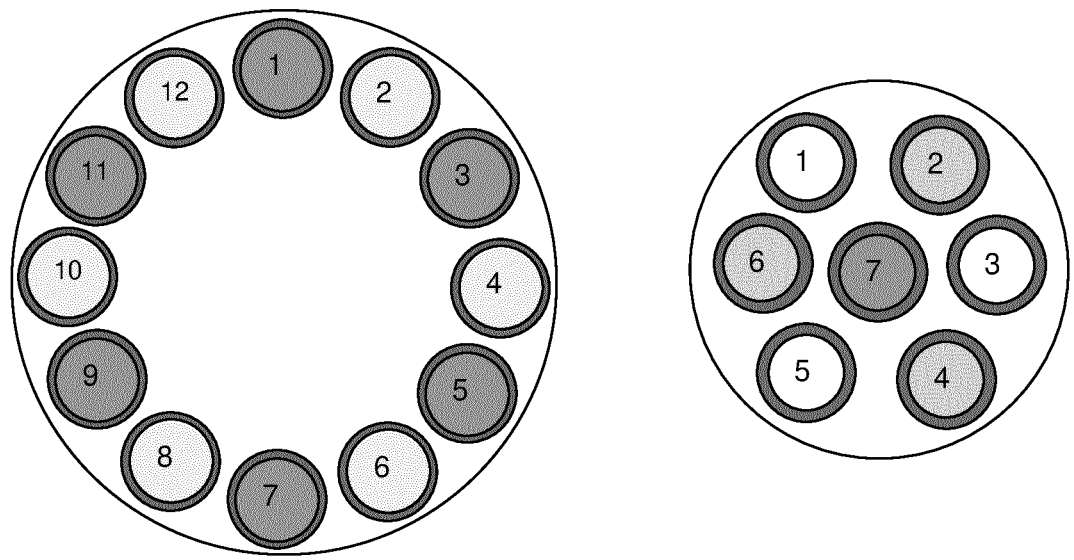
FIG. 7 illustrates cross sections views of multi-core fibers, with a first multi-core fiber is a 12-cores heterogeneous trench-assisted multi-core fiber comprising twelve cores arranged on a ring around the fiber axis and a 7-cores heterogeneous trench-assisted, according to some embodiments.

FIG. 7 depicts two cross sections of two exemplary 12-cores and 7-cores trench-assisted heterogeneous multi-core fibers.

In some embodiments, each core of the multi-core fiber may be single mode comprising one spatial propagation mode.

In some embodiments, the multi-core fiber may comprise at least one multi-mode core comprising two or more spatial propagation modes.

The optical fiber transmission channel 13 may further comprise one or more amplifiers 132 inserted in the fiber for re-amplifying the optical power and compensating for the fiber attenuation without the need to regenerate the optical signals such that a sufficient signal power can be maintained over large distance where optical signals need to be periodically amplified.

The amplifiers 132 may be inserted between each pair of fiber slices 131. In particular, an amplifier 132 inserted at the end of the optical fiber transmission channel performs signal amplification before signal detection at the receiver 15.

Each amplifier 132 may be configured to simultaneously amplify the optical signal corresponding to the plurality of cores in the multi-core fiber.

In some embodiments, the amplifiers 132 may consist of a duplication of a single core fiber amplifier.

In other embodiments, an amplifier 132 may be an optical multi-core amplifier. Exemplary optical amplifiers comprise multi-core Erbium doped fiber amplifiers (EDFAs) such as core-pumped multi-core EDFAs and cladding-pumped EDFA amplifiers. Core-pumped and cladding pumped amplifiers may use a single or a plurality of pump diodes. In particular, a pump diode per core may be used in EDFA amplifiers.

In some embodiments, the optical signal amplification may be performed in a distributed manner using the non-linear simulated Raman scattering effect. In such embodiments, the fiber is used as both a transmission link and an amplification medium.

In other embodiments, signal amplification may be achieved by a joint use of regularly arranged optical amplifiers and of simulated Raman Scattering effects.

In still other embodiments, the signal amplification may be performed in the electrical domain through an optical/electrical conversion (not illustrated in FIG. 1). In such embodiments, the optical fiber transmission channel 13 may comprise, at each amplification stage:
- a photodiode for converting the optical signal back to the electrical domain;
- an electrical amplifier for amplifying the converted electrical signal; and
- a laser diode for generating an optical signal corresponding to the amplified electrical signal.

According to some embodiments (not illustrated in FIG. 1), the optical transmission channel 13 may further comprise one or more of:
- dispersion compensators for counteracting the effects of chromatic dispersion, a dispersion compensator being configured to cancel the chromatic dispersion or compensate the dispersion for example before the detection of the optical signal at the receiver 15;
- optical switches and multiplexers such as optical add/drop multiplexers implemented in wavelength division multiplexing systems;
- one or more devices for regenerating the optical signal such as electronic and optical regenerators.

The following description of certain embodiments of the invention will be made with reference to an optical communication system 100 using a single-mode multi-core fiber in which each core comprises a single propagation mode and uses a single polarization, for illustration purposes only. However, the skilled person will readily understand that the various embodiments of the invention can also be applied in multi-core fibers in combination with polarization multiplexing using two polarizations and/or in combination with wavelength multiplexing using a plurality of wavelengths, and/or in combination with mode multiplexing using multimode fiber cores.

To facilitate the understanding of some embodiments of the invention, there follows notations and/or definitions used hereinafter:
- L designates the total length of the multi-core fiber in the optical fiber transmission channel 13.
- $N_c \geq 2$ designates the total number of cores in the multi-core fiber, the cores being numbered (i.e. each core being associated with a core number varying between 1 and $N_c$) such that a core is designated as core-n with n taking value between 1 and $N_c$.
- K designate the number of fiber sections concatenated in the multi-core fiber (also referred to as 'fiber slices' or 'fiber spans').
- l designates a normalization factor used to compensate the loss in the optical fiber link.
- d designates a correlation length.
- $R_b$ designates a bending radius.
- $R_n$ designates the radius of core-n.
- $XT_{n,m}$ refers to a crosstalk coefficient (also referred to as 'inter-core crosstalk coefficient') quantifying the crosstalk (also referred to as 'inter-core cross-talk') between the core-n and the core-m with n≠m.
- $k_{n,m}$ refers to a coupling coefficient (also referred to as 'inter-core coupling') quantifying the coupling (also referred to as 'inter-core coupling') between the core-n and the core-m with n≠m.
- $\Delta\beta_{nm}$ stands for the propagation constant difference between the core-n and the core-m with n≠m.
- $P \in \mathbb{C}^{N_c \times N_c}$ designates a precoding matrix.

Figure 8:
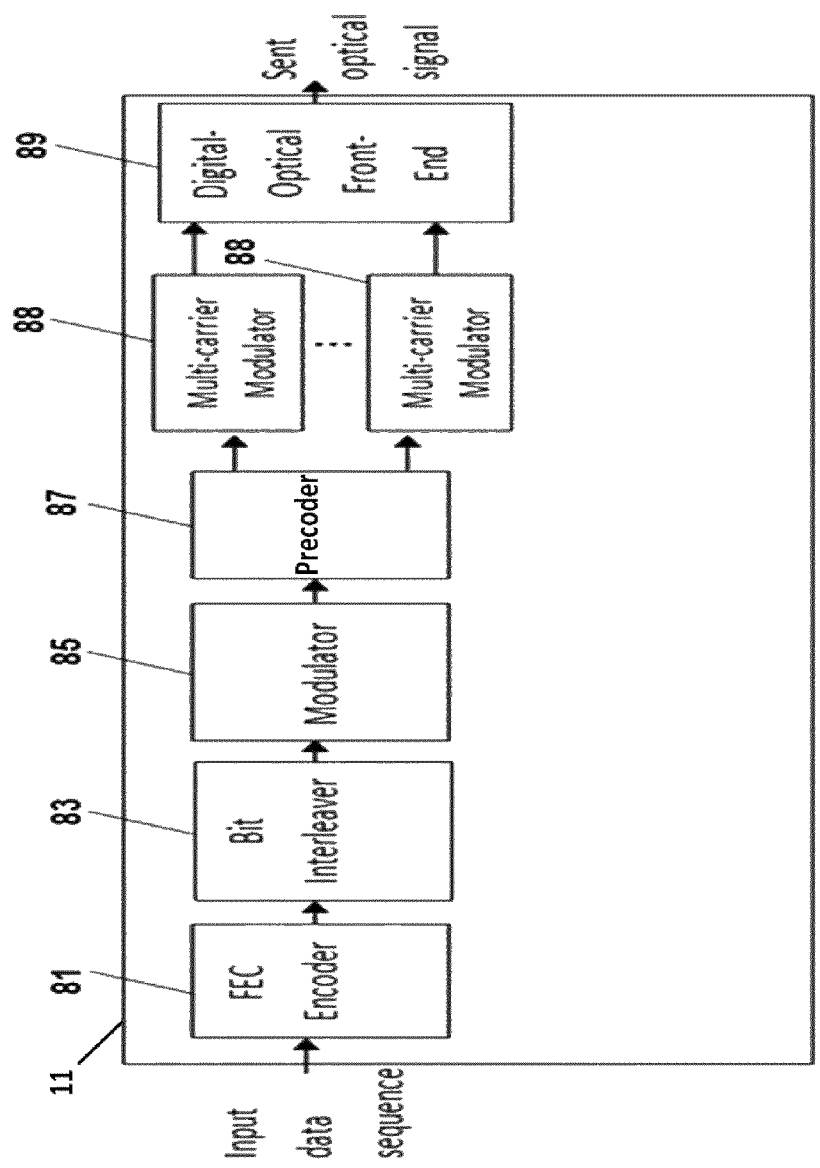
FIG. 8 is a block diagram illustrating the structure of an optical transmitter according to some embodiments of the invention in which linear precoding is implemented.

FIG. 8 shows the block structure of an optical transmitter 11 according to some embodiments of the invention. The optical transmitter 11 may be configured to transform an input data sequence into an optical signal to be transmitted through the optical transmission channel 13.

Accordingly, the optical transmitter 11 may comprise a Forward Error Correcting code (FEC) encoder 81 (also referred to as 'an error correcting code encoder 81') configured to encode an input data sequence of length k (i.e. comprising k symbols) into an encoded sequence in the form of a codeword vector of length n>k by applying at least one Forward Error Correcting code (FEC) (also referred to as 'an error correcting code').

According to some embodiments, the input data sequence may be a binary sequence comprising k bits. The FEC encoder 81 may be configured, in such embodiments, to encode the input binary sequence into a binary codeword vector comprising n bits by applying at least one binary FEC code.

In other embodiments, the input data sequence may comprise symbols that take values in a Galois Field GF(q) with q>2 representing the order of the Galois Field. In such embodiments, the FEC encoder 22 may be configured to encode the input data sequence into a codeword vector comprising n symbols, each symbol comprised in the codeword vector takes value in the Galois Field GF(q). The encoding process in this case may be performed using a non-binary FEC code constructed over GF(q) with q>2.

By performing the coding operation, the FEC encoder 81 adds redundant bits (in general redundant symbols) to the input binary sequence so that the receiver can detect and/or correct common transmission errors. The use of a FEC code provides an additional protection and immunity against transmission errors and allows significant improvement in performance with respect to uncoded transmission (i.e. transmission of modulated data without FEC encoding).

Additional improvements and reduction on the probability of error may be achieved through the concatenation of two or more FEC codes. Concatenation of codes may follow a serial, a parallel, or a multi-level architecture. The FEC encoder 81 may be accordingly configured to implement two or more FEC codes.

The optical transmitter 11 may further comprise an interleaver 83 configured to mix the encoded sequence to add a protection layer to the encoded symbols against burst errors. The interleaved encoded sequence may be then processed by a modulator 85 configured to determine a set of modulated symbols in a form of a modulated symbol vector $s_c$ by applying a modulation scheme to the interleaved encoded sequence (or to the codeword vectors in embodiments where the transmitter 11 does not comprise an interleaver). Different modulation schemes may be implemented such as $2^q$-QAM or $2^q$-PSK with $2^q$ symbols or states. The modulated vector $s_c$ may be a complex-value vector comprising K complex-value symbols $s_1, s_2, \ldots, s$, with q bits per symbol. When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet $A=[-(q-1), (q-1)]$.

According to the embodiments of the invention, the optical transmitter 11 implements linear precoding techniques to precode the vector of information symbols into a precoded vector denoted $s_p$ using a precoding matrix denoted $P \in \mathbb{C}^{N_c \times N_c}$ and comprising complex values. Accordingly, the optical transmitter 11 may comprise a precoder 87 configured to determine a precoding matrix P depending on one or more fiber parameters associated with the multi-core fiber and to precode the vector of information symbols by applying linear precoding that consists in multiplying the vector of information symbols by the precoding matrix, such that the precoded vector is given by $s_p = P \cdot s_c$. The precoded vector $s_p \in \mathbb{C}^{N_c}$ is a vector of dimension $N_c$ comprising complex values.

The embodiments of the invention provide efficient linear precoding techniques to pre-compensate the channel effect at the optical transmitter. Existing linear precoding techniques used in wireless communication systems rely on perfect channel state information at the transmitter where the receiver communicates an estimate of the channel matrix to the transmitter via a feedback link. The embodiments of the invention provide linear precoding techniques that do not require feedback from the receiver to send the estimated channel matrix to the transmitter and consider an auxiliary matrix (also referred to as 'auxiliary channel matrix') denoted H that is determined based on a channel model defining the multicore fiber transmission channel. The multicore channel model is implemented at the optical transmitter to predict and estimate the performance behavior of the multicore fiber transmission channel by evaluating the core dependent loss for the multi-core fiber transmission channel made of a multi-core fiber associated with pre-defined fiber configuration and fiber parameters and misalignment losses values.

Accordingly, the precoder 87 may be configured to determine a core dependent loss value $\lambda_n$ (also referred to as 'a core loss value') associated with each core core-n for $n=1, \ldots, N$, depending on the fiber parameters and at least one misalignment loss value.

According to some embodiments, the fiber parameters comprise a fiber length L, a number of cores $N_c \geq 2$ at least equal to two, crosstalk coefficients $XT_{n,m}$ with n, $m \in \{1, \ldots, N_c\}$, and coupling coefficients $k_{n,m}$ with n, $m \in \{1, \ldots, N_c\}$, each crosstalk coefficient $XT_{n,m}$ representing a crosstalk between the core-n and the core-m with n≠m in the multi-core fiber, each coupling coefficient $k_{n,m}$ representing a coupling the core-n and the core-m with n≠m in the multi-core fiber.

The fiber parameters may further comprise a bending radius, a number of fiber slices K, the cladding diameter, the radius of each core of the multi-core fiber, and the type of each core of the multi-core fiber.

In some embodiments, the misalignment losses may rise due to the imperfections of the optical fiber at the fiber spans and of the connectors (e.g. the connectors between the FAN-IN/FAN-OUT devices and the input/output ends of the optical fiber transmission channel). Misalignment losses may comprise a misalignment chosen in a group comprising a longitudinal misalignment, a transverse misalignment, and angular misalignment.

According to some embodiments, the misalignment losses may be modeled as random Gaussian variables. More specifically, the misalignment loss associated with core-n may be modeled as a random Gaussian variable of zero-mean and a standard deviation denoted by $\sigma_{(x,y),n}$ expressed according to:

$$\sigma_{(x,y),n} = \frac{r_d}{R_n} \quad (1)$$

In equation (1), $r_d$ designates the transverse displacement of the multi-core fiber in the 'x' and 'y' directions.

The channel model considers the transmission of a vector of information symbols denoted X over a multicore fiber transmission channel represented by a channel matrix H, the vector of information symbols being sent to the optical receiver 15. Further, the channel model considered to determine the auxiliary channel matrix used for precoding takes into account inter-core crosstalk effects and misalignment effects. Accordingly, the optical fiber transmission channel 13 may be represented by an optical multiple-input multiple-output (MIMO) system described by the relation:

$$Y = H \cdot X + N \quad (2)$$

In equation (2):
X designates a complex-value vector of length $N_c$ comprising $N_c$ symbols transmitted over the optical transmission channel 13 such that the $n^{th}$ symbol is transmitted over the core-n with $n=1, \ldots, N_c$;
Y is a complex-value vector of length $N_c$ designating the received signal at the optical receiver 15;
H is a complex-value matrix of dimensions $N_c \times N_c$ designating an optical channel matrix and representing the undergone attenuations and the losses experienced by the cores during the optical signal propagation over the different cores in the multi-core fiber in addition to the misalignment losses, and
N is a complex-value vector of length $N_c$ designating the optical channel noise.

According to some embodiments, the optical channel noise may be a White Gaussian Noise of zero-mean and variance $N_0$.

The inter-core crosstalk effects may be represented by a cross-talk channel matrix denoted $H_{XT}$ expressed according to:

$$H_{XT} = \begin{bmatrix} XT_1 & XT_{1,2} & \ldots & XT_{1,N_c} \\ XT_{2,1} & \ddots & \ldots & XT_{2,N_c} \\ \vdots & \vdots & \ddots & \vdots \\ XT_{N_c,1} & XT_{N_c,2} & \ldots & XT_{N_c,N_c} \end{bmatrix} \quad (3)$$

In equation (3), the diagonal entries of the crosstalk channel matrix are given by $XT_n = 1 - \Sigma_{n \neq m} XT_{n,m}$. The crosstalk represents the exchanging energy between the cores and can be estimated based on the coupled-power theory, known to the person skilled in the art.

According to some embodiments in which the multi-core fiber is homogeneous, the crosstalk coefficients $XT_{n,m}$ quantifying the crosstalk between each core-n and core-m with $n \neq m$ are expressed according to:

$$XT_{n,m} = \frac{2k_{n,m}^2 R_b}{\beta^2 \Lambda} L \tag{4}$$

In equation (4), $\Lambda$ designates the core-to-core distance and $\beta^2$ is the propagation constant.

According to some embodiments in which the multi-core fiber is heterogeneous, the crosstalk coefficients $XT_{n,m}$ quantifying the crosstalk between each core-n and core-m with $n \neq m$ are expressed according to:

$$XT_{n,m} = \frac{2k_{n,m}^2}{\Delta \beta_{n,m}^2 d} L \tag{5}$$

According to some embodiments, the precoder 87 to may be configured to determine a core loss value $\Lambda_n$ associated with each core core-n for $n = 1, \ldots, N_c$ by applying a singular value decomposition to the optical channel matrix H representative of the optical fiber transmission channel 13. The singular value decomposition of the optical channel matrix can be expressed according to:

$$H = \sqrt{l} U \cdot \Sigma \cdot V \tag{6}$$

In equation (6), $U \in \mathbb{C}^{N_c \times N_c}$ and $V \in \mathbb{C}^{N_c \times N_c}$ designate two unitary matrices and the matrix X is a $N_c \times N_c$ diagonal matrix given by:

$$\sum = \begin{bmatrix} \alpha_1 XT_1 & \cdots & 0 \\ \vdots & \ddots & \vdots \\ 0 & \cdots & \alpha_{N_c} XT_{N_c} \end{bmatrix} \tag{7}$$

In equation (7), $\alpha_i$ designates the total misalignment loss coefficient associated with the core core-i and $XT_i = 1 - \Sigma_{i \neq m} XT_{i,m}$ designates a total crosstalk coefficient quantifying the total crosstalk associated with the core core-i at the end of the optical transmission channel 13, the total crosstalk coefficient associated with the core core-i being dependent on the crosstalk coefficients quantifying the crosstalk between said core core-i and the remaining cores in the multi-core fiber.

The multi-core fiber is made of a concatenation of K fiber spans, each span is equivalent to a multiplication of a crosstalk channel matrix and a misalignment channel matrix. Accordingly, the optical MIMO system of equation (2) can be equivalently expressed according to:

$$Y = \sqrt{l} \Pi_{k=1}^K \alpha_i^k = c \cdot \exp(Z_i); Z_i = \Sigma_{k=1}^K -b(dx_{k,i}^2 + dy_{k,i}^2) \tag{9}$$

In equation (8):
l designates a normalization factor used to compensate the optical fiber link loss;
$H_{XT,k}$ designates the crosstalk channel matrix associated with the $k^{th}$ fiber span, and
$M_k$ designates the misalignment channel matrix associated with the $k^{th}$ fiber span.

Using the fiber decomposition into fiber spans, the total misalignment losses coefficients $\alpha_i$ may be given by:

$$\alpha_i = \Pi_{k=1}^K \alpha_i^k = c \cdot \exp(Z_i); Z_i = \Sigma_{k=1}^K -b(dx_{k,i}^2 + dy_{k,i}^2) \tag{9}$$

In equation (9), $dx_{k,i}^2$ and $dy_{k,i}^2$ for $i = 1$, designate Chi-squared distributed random variables with one degree of freedom, a mean value equal to $(\sigma_{(x,y),i})^2$, and a variance equal to $2(\sigma_{(x,y),i})^4$.

Considering embodiments in which the number of fiber spans K is high, the precoder 87 may be configured to determine each variable $Z_i$ as a normally distributed variable with mean $\mu_{Z_i} = -2Kb(\sigma_{(x,y),i})^2$ and variance $\sigma_{Z_i}^2 = 4Kb^2 \sigma_{(x,y),i}^4$. Accordingly, the misalignment losses coefficients $\alpha_i$ can be modeled by a lognormal random variable with a mean value $\mu_{\alpha_i}$ and a variance value $\sigma_{\alpha_i}^2$ given respectively by:

$$\mu_{\alpha_i} = \exp(\mu_{Z_i} + \sigma_{Z_i}^2/2) \tag{10}$$

$$\sigma_{\alpha_i}^2 = (\exp(\sigma_{Z_i}^2) - 1) \cdot \mu_{\alpha_i}^2 \tag{11}$$

According to the derivation of the singular value decomposition of the optical channel matrix, the optical MIMO system of equations (2) and (6) can be expressed according to:

$$Y = \sqrt{l} \cdot U \cdot \begin{bmatrix} \alpha_1 XT_1 & \cdots & 0 \\ \vdots & \ddots & \vdots \\ 0 & \cdots & \alpha_{N_c} XT_{N_c} \end{bmatrix} V \cdot X + N = \tag{12}$$

$$\sqrt{l} \cdot U \cdot \begin{bmatrix} \lambda_1 & \cdots & 0 \\ \vdots & \ddots & \vdots \\ 0 & \cdots & \lambda_{N_c} \end{bmatrix} V \cdot X + N$$

According to the channel models given in equations (8) and (12), the precoder 87 may be configured to determine the core loss value $\lambda_n$ associated with each core core-n, for $n = 1, \ldots, N$, such that the core loss value $\lambda_n$ is a lognormally distributed variable with mean $\mu_{\lambda_n} = \mu_{\alpha_n} XT_n$ and variance $\sigma_{\lambda_n}^2 = \sigma_{\alpha_n}^2$, the mean and the variance of each core loss value being dependent on the fiber parameters involving the total crosstalk coefficient $XT_n$ associated with each core and on the misalignment losses rising in the mean and the variance of the lognormal distribution of the misalignment losses coefficients $\alpha_i$. More specifically, the precoder 87 may be configured to determine the mean value $\mu_{\lambda_n}$ of each core loss value $\lambda_n$ associated with each core core-n of the multi-core fiber as the product between a first value and a second value, the first value $\mu_{\alpha_n}$ corresponding to the mean of the lognormal random variable $\alpha_n$ representing the total misalignment loss associated with the core core-n, the second value $XT_n^2$ corresponding to the square of the total crosstalk coefficient associated with said the core core-n. The precoder 87 may be further configured to determine the variance value $\sigma_{\lambda_n}^2$ of each core loss value $\lambda_n$ associated with each core core-n of the multi-core fiber as the product between the total crosstalk coefficient $XT_n$ associated with the core core-n and a third value corresponding to the variance $\sigma_{\alpha_n}^2$ of the lognormal random variable $\alpha_n$ representing the total misalignment loss associated with the core core-n.

Based on the channel model, the precoder 87 may be configured to determine an average channel matrix realization using the average values of the mathematical channel model. Accordingly, the precoder 87 may be configured to:
determine the normalization factor l as the ratio between the number of the two or more cores $N_c$ and the sum of the core loss values $\lambda_n$ associated with the two or more cores core-n, for $n = 1, \ldots, N_c$ such that:

$$l = \frac{N_c}{\sum_{n=1}^{N_c} \lambda_n} \quad (13)$$

determine, randomly, a first unitary matrix $U_r \in \mathbb{C}^{N_c \times N_c}$ and a second unitary matrix $V_r \in \mathbb{C}^{N_c \times N_c}$;

determine a diagonal matrix $\Sigma$ comprising diagonal components, the diagonal components being equal to the mean values of the random variables defining the core loss values associated with the two or more cores such that the $n^{th}$ diagonal component is the mean value $\mu_{\lambda_n}$ of the core loss value $\lambda_n$ associated with the $n^{th}$ of the multicore fiber according to:

$$\Sigma = \begin{bmatrix} \mu_{\lambda_1} & \cdots & 0 \\ \vdots & \ddots & \vdots \\ 0 & \cdots & \mu_{\lambda_{N_c}} \end{bmatrix} \quad (14)$$

determine an auxiliary matrix $\overline{H}$ as the product between the square root of the normalization factor l, the first unitary matrix $U_r$, the diagonal matrix $\Sigma$, and the second unitary matrix $V_r$ such that:

$$\overline{H} = \sqrt{l} \cdot U_r \cdot \Sigma \cdot V_r \quad (15)$$

determine the precoding matrix P as the inverse of the auxiliary matrix $\overline{H}$ such that $P = \overline{H}^{-1}$.

The precoder 87 may then determine a precoded vector of information symbols by multiplying the vector of information symbols by the precoding matrix such that $s_p = P \cdot s_c$.

The optical transmitter 11 may further comprise a plurality of multi-carrier modulators 88 configured to generate multi-carrier symbols by implementing a multi-carrier modulation technique within each optical carrier involving a large number of orthogonal sub-carriers. Moreover, multi-carrier modulations may be implemented for providing a better resistance to the inter-symbol interference resulting from the fiber dispersion. Exemplary multi-carrier modulation formats comprise Orthogonal Frequency Division Multiplexing (OFDM) and Filter Bank Multi-Carrier (FBMC).

The frequency-domain signal delivered by the multicarrier modulators 88 may be then processed by a digital-optical Front-End 89 configured to convert the received frequency-domain signal to the optical domain. The digital-optical Front-End 88 may perform the conversion using a number of lasers of given wavelengths and a plurality of optical modulators (not shown in FIG. 8) associated with the used polarization states and the spatial propagation modes in the cores of the multi-core fiber. A laser may be configured to generate a laser beam of a same or different wavelength using Wavelength Division Multiplexing (WDM) techniques. The different laser beams may be then modulated using the different outputs of the OFDM symbols (or the different values of the precoded information symbols in embodiments using single-carrier modulations) by means of the optical modulators. The modulated signals may be then polarized according to the different polarization states of the fiber. Exemplary modulators comprise Mach-Zehnder modulators. A phase and/or amplitude modulation may be used. In addition, the modulation scheme used by the various optical modulators for modulating the different optical signals may be similar or different.

The number of the optical modulators and lasers depends on the number of used polarization states, the number of used propagation modes in each core of the multi-core fiber, and on the number of cores in the fiber.

The digital-optical front-end 88 may further comprise a FAN-IN device (not illustrated in FIG. 8) configured to inject the generated optical signals into each core of the multi-core fiber to propagate according to the available propagation modes in each core. Optical connectors may be used to connect the output end of the FAN-IN device and the input end of the multi-core optical transmission channel 13.

The optical signals generated according to any of the preceding embodiments may propagate along the fiber until reaching the other end of the optical transmission channel 13 where it is processed by an optical receiver 15.

The transmitted signals should satisfy a transmit power constraint such that the total transmitted energy across all the $N_c$ cores of the multicore fiber is equal to $N_c \cdot E_0$ with $E_0$ designating the average signal energy transmitted per core.

Figure 9:
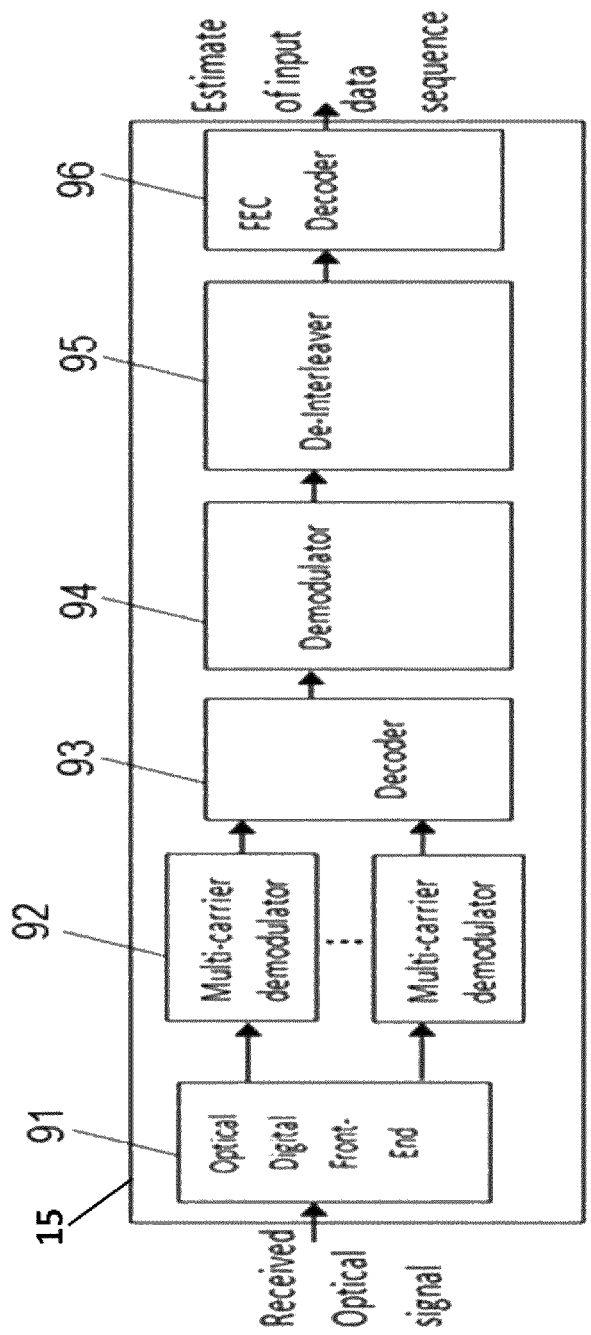
FIG. 9 is a block diagram illustrating the structure of an optical receiver according to some embodiments of the invention.

FIG. 9 is a block diagram of an optical receiver 15 according to some embodiments. The optical receiver 15 is configured to receive the optical signal transmitted by the optical transmitter 11 through the transmission channel 13 and to generate an estimate of the original input data sequence. The received signal at the optical receiver 15 may be written as:

$$y = H \cdot s_p + N \quad (16)$$

Referring to FIG. 9, the optical receiver 15 may comprise:
an optical-digital front-end 91 configured to detect the optical signals, using for example one or more photodiodes, and to convert them into a digital signal. The optical-digital front-end 91 may comprise a FAN-OUT device (not illustrated in FIG. 9);
a plurality of multi-carrier demodulators 92 configured to remove the cyclic prefix and generate a set of decision variables to be delivered to the decoder 93;
a decoder 93 configured to generate an estimate of the modulated data sequence from the set of decision variables by applying a decoding algorithm;
a demodulator 94 configured to generate a binary sequence by performing a demodulation of the modulated data sequence estimated by the decoder 93;
a de-interleaver 95 configured to rearrange the order of the bits (in general the symbols) in the binary sequence delivered by the demodulator 94 to restore the original order of the bits; and
a FEC decoder 96 (also referred to as 'an error correcting code decoder 96') configured to deliver an estimate of the input data sequence processed by the optical transmitter device 11 by applying a soft or hard-decision FEC decoder to the reordered binary sequence delivered by the de-interleaver 95. Exemplary soft-decision FEC decoders comprise the Viterbi algorithm.

The decoder 93 may implement a decoding algorithm chosen in a group consisting of a maximum likelihood (ML) decoder, a Zero-Forcing decoder, a Zero-Forcing Decision Feedback Equalizer, and a Minimum Mean Square Error decoder. Exemplary maximum likelihood decoders comprise the sphere decoder, the Schnorr-Euchner decoder, the stack decoder, the spherical-bound-stack decoder. Such ML decoders are sequential decoders that perform a tree-search in a decoding tree associated with the received received signal to search for the optimal ML solution. Sub-optimal implementations of the Stack decoder and the SB-stack decoder may further be used using a parameter known as 'a bias' parameter.

In embodiments using single-carrier modulations, the plurality of multi-carrier modulators 92 may be replaced by a single modulator. Similarly, the multi-carrier demodulators 92 may be replaced by a single demodulator.

In some embodiments in which the FEC encoder 81 implements a concatenation of two or more forward error correcting codes, a corresponding structure may be implemented by the FEC decoder 96. For example, in embodiments based on a serial concatenation of an inner code and an outer code, the FEC decoder 96 may comprise an inner code decoder, a de-interleaver, and an outer code decoder (not shown in FIG. 9). In embodiments involving two codes in a parallel architecture, the FEC decoder 96 may comprise a de-multiplexer, a de-interleaver, and a joint decoder (not shown in FIG. 9).

Figure 10:
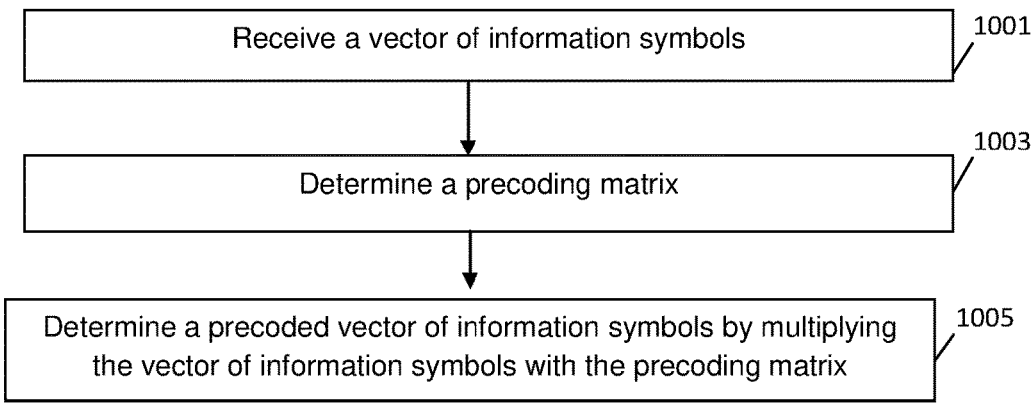
FIG. 10 is a flowchart illustrating a method for transmitting a vector of information symbols in a multi-core fiber optical transmission system according to some embodiments of the invention.

Referring to FIG. 10, there is also provided a method for transmitting a vector of information symbols s, over an optical fiber transmission channel made of a multi-core fiber that comprises two or more cores $N_c \geq 2$.

At step 1001, a vector of information symbols $s_c \in \mathbb{C}^{N_c}$ comprising $N_c$ complex values may be received.

At step 1003, a precoding matrix $P \in \mathbb{C}^{N_c \times N_c}$ may be determined.

At step 1005, a precoded vector of information symbols $s_p \in \mathbb{C}^{N_c}$ may be determined by multiplying the vector of information symbols with the precoding matrix such that $s_p = P \cdot s_c$.

Figure 11:
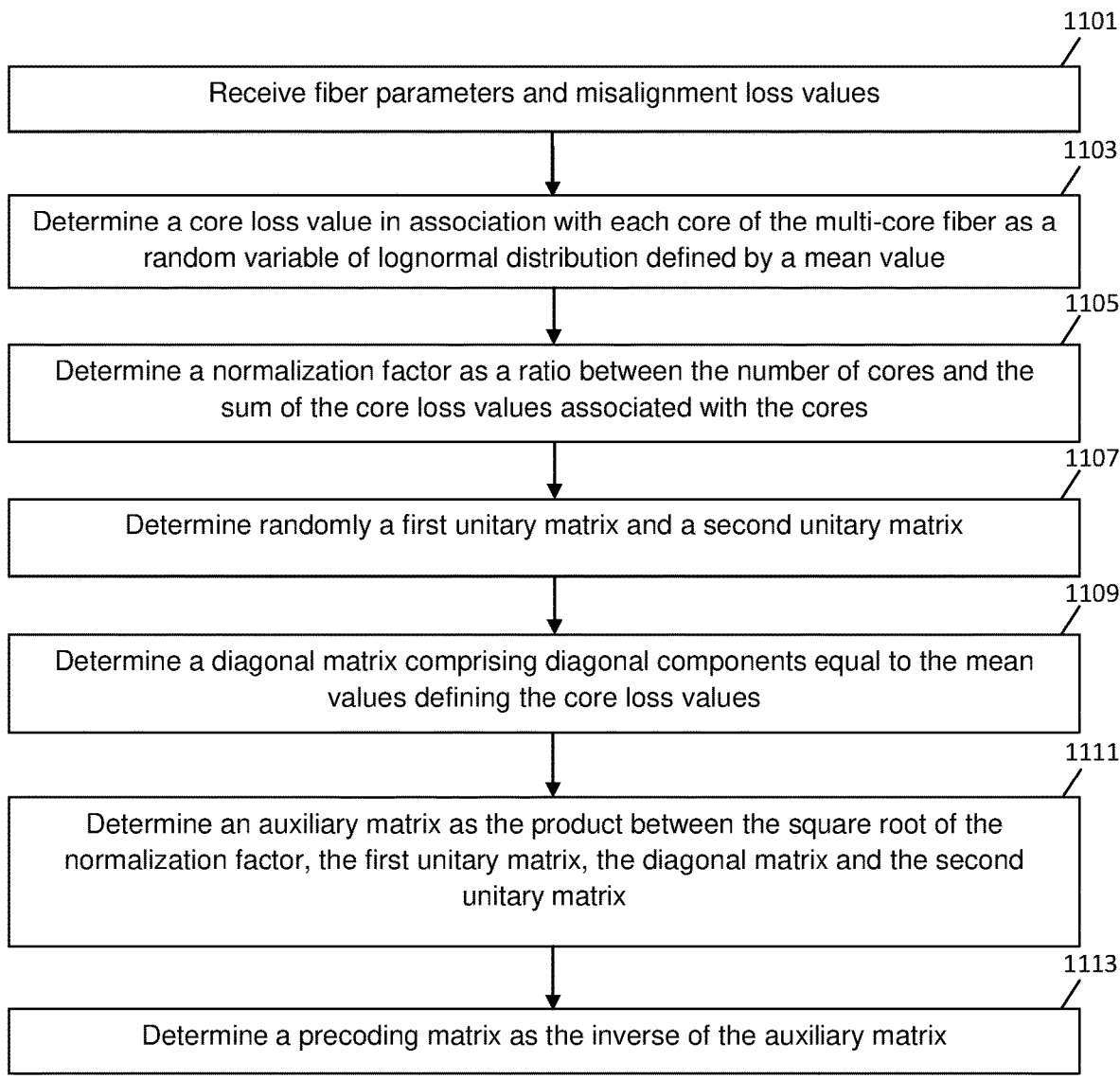
FIG. 11 is a flowchart illustrating a precoding matrix determination step according to some embodiments of the invention.

FIG. 11 is a flowchart depicting the step 1003 for determining a precoding matrix $P \in \mathbb{C}^{N_c \times N_c}$ according to some embodiments of the invention in which an auxiliary matrix determined based on a channel model defining the multicore fiber transmission channel is used to determine the precoding matrix.

At step 1101, fiber parameters of the multi-core fiber and misalignment loss values may be received.

In some embodiments, the fiber parameters may comprise the number of cores $N_c \geq 2$, the length L of the fiber, crosstalk coefficients $XT_{n,m}$ with n, m $\in \{1, \ldots, N\}$, and coupling coefficients $k_{n,m}$ with n, m $\in \{1, \ldots, N_c\}$, each crosstalk coefficient $XT_{n,m}$ representing a crosstalk between the core-n and the core-m with n≠m in the multi-core fiber, each coupling coefficient $k_{n,m}$ representing a coupling the core-n and the core-m with n≠m in the multi-core fiber.

In some embodiments, the fiber parameters may further comprise the bending radius $R_b$, the cladding diameter, the number K of fiber slices, the radius of each core of the multi-core fiber, and the type $T_n$ of each core core-n of the multi-core fiber, with n=1, ..., $N_c$.

In some embodiments, misalignment losses comprise longitudinal misalignments, transverse misalignments, and angular misalignments.

In some embodiments, the misalignment losses values may be previously determined according to equation (1).

At step 1103, a core loss value $\lambda_n$ associated with each core core-n for n=1, ..., $N_c$ may be determined. In particular, the core loss values associated with the cores of the multi-core fiber may be determined depending on at least one crosstalk coefficient and at least one misalignment loss value (also referred to as 'misalignment loss coefficient'). More specifically, the core loss value $\lambda_n$ associated with each core core-n, for n=1, ..., $N_c$ may be determined as a random variable of a lognormal distributed with mean $\mu_{\lambda_n} = \mu_{\alpha_n} XT_n$ and variance $\sigma_{\lambda_n}^2 = \sigma_{\alpha_n}^2$, the mean and the variance of each core loss value being dependent on the fiber parameters involving the total crosstalk coefficient $XT_n$ associated with each core and on the misalignment losses rising in the mean and the variance of the lognormal distribution of the misalignment losses coefficients $\alpha_i$ given in equation (9).

According to some embodiments, the mean value $\mu_{\lambda_n}$ of each core loss value $\lambda_n$ associated with each core core-n of the multi-core fiber may be determined as the product between a first value and a second value, the first value $\mu_{\alpha_n}$ corresponding to the mean of the lognormal random variable $\alpha_n$ representing the total misalignment loss associated with the core core-n, the second value $XT_n^2$ corresponding to the square of the total crosstalk coefficient associated with the core core-n.

According to some embodiments, the variance value $\sigma_{\lambda_n}^2$ of each core loss value $\lambda_n$ associated with each core core-n of the multi-core fiber may be determined as the product between the total crosstalk coefficient $XT_n$ associated with the core core-n and a third value corresponding to the variance $\sigma_{\alpha_n}^2$ of the lognormal random variable $\alpha_n$ representing the total misalignment loss associated with the core core-n.

At step 1105, a normalization factor l may be determined as the ratio between the number of the two or more cores $N_c$ and the sum of the core loss values $\lambda_n$ associated with the two or more cores core-n, for n=1, ..., $N_c$ according to equation (13).

At step 1107, a first unitary matrix $U_r \in \mathbb{C}^{N_c \times N_c}$ and a second unitary matrix $V_r \in \mathbb{C}^{N_c \times N_c}$ may be determined randomly.

At step 1109, a diagonal matrix E comprising diagonal components may be determined. The diagonal components are equal to the mean values of the random variables defining the core loss values associated with the two or more cores such that the $n^{th}$ diagonal component is the mean value $\mu_{\lambda_n}$ of the core loss value $\lambda_n$ associated with the $n^{th}$ of the multicore fiber according to equation (14).

At step 1111, an auxiliary matrix $\bar{H}$ may be determined as the product between the square root of the normalization factor $\sqrt{l}$, the first unitary matrix $U_r$, the diagonal matrix $\Sigma$, and the second unitary matrix $V_r$ according to equation (15).

At step 1113, a precoding matrix P may be determined as the inverse of the auxiliary matrix $\bar{H}$ such that $P = \bar{H}^{-1}$.

Performance of the proposed linear precoding techniques (referred to as 'ZF pre-compensation') has been evaluated in terms of bit error rate and compared to the performance obtained for the Gaussian channel in which the core dependent loss is null, and to the performance obtained using deterministic core scrambling. Two multicore fibers are considered, a 7-core heterogeneous multicore fiber with three core types is used in combination with snail scrambling, and a 12-core heterogeneous multicore fiber with two types of cores is used in combination with circular scrambling.

Figure 12:
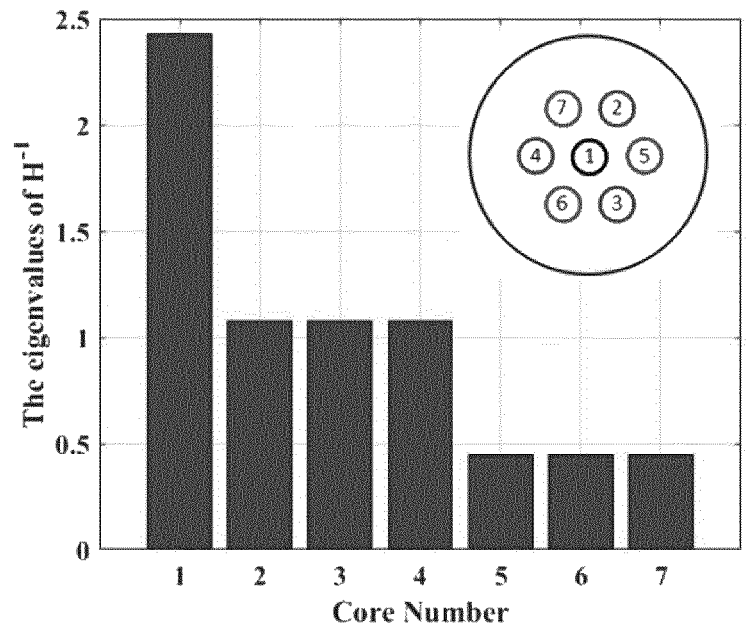
FIG. 12 illustrates the eigenvalues of the transmitted signal after linear precoding for a 7-core heterogeneous fiber, according to some embodiments of the invention.

FIG. 12 illustrates the eigenvalues of the transmitted signal after linear precoding for the 7-core fiber and unitary average energy transmitted per core. Numerical results show that the sum of the eigenvalues is equal to seven ('7') which satisfies the linear regime constraints and the total power constraint.

Figure 13:
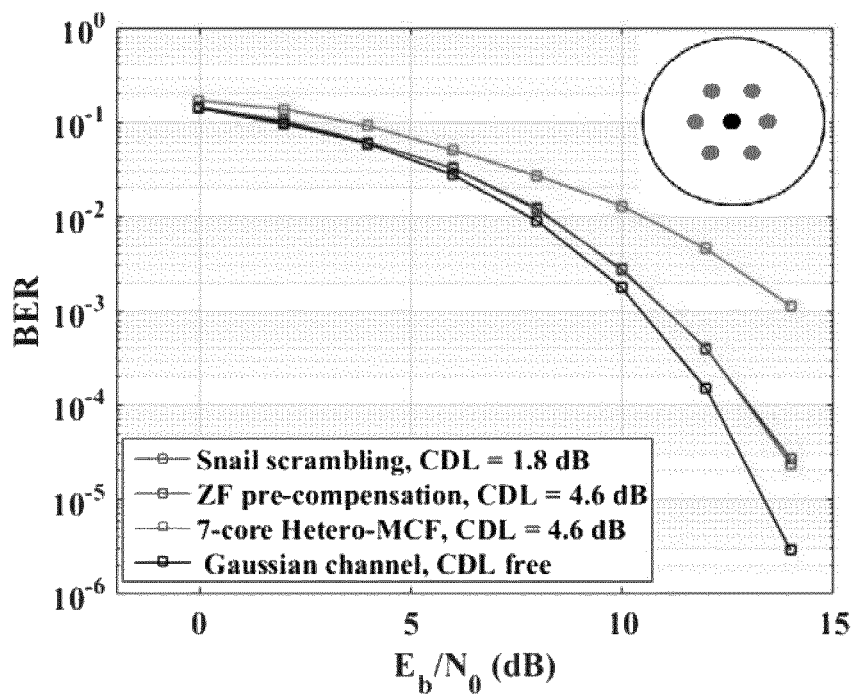
FIG. 13 illustrates the bit error rate performance as function of the signal-to-noise ratio obtained in a 7-core heterogeneous fiber, according to some embodiments of the invention.

FIG. 13 illustrates diagrams evaluating the bit error rate performance function of the signal-to-noise ratio obtained in a 7-core heterogeneous fiber for snail scrambling-based transmission system using 6 snail scramblers, ZF pre-compensation according to the embodiments of the invention, the Gaussian channel (CDL free), and the 7-core heterogeneous fiber without scrambling nor precoding. The use of 6 snail scramblers provides the optimal CDL reduction. Fibers of lengths 100 km (L=300 km) and 300 fiber sections (K=300) are considered. 16-QAM modulations are used in the optical transmitter and the ZF decoder is used at the optical receiver in the decoder 93. Numerical results show that ZF pre-compensation enhances the system performance by adding a gain of 4 dB and reaches the same performance as the snail scramblers with SNR penalty equal to 2 dB at bit error rate BER=$10^{-3}$ compared to the Gaussian channel.

Figure 14:
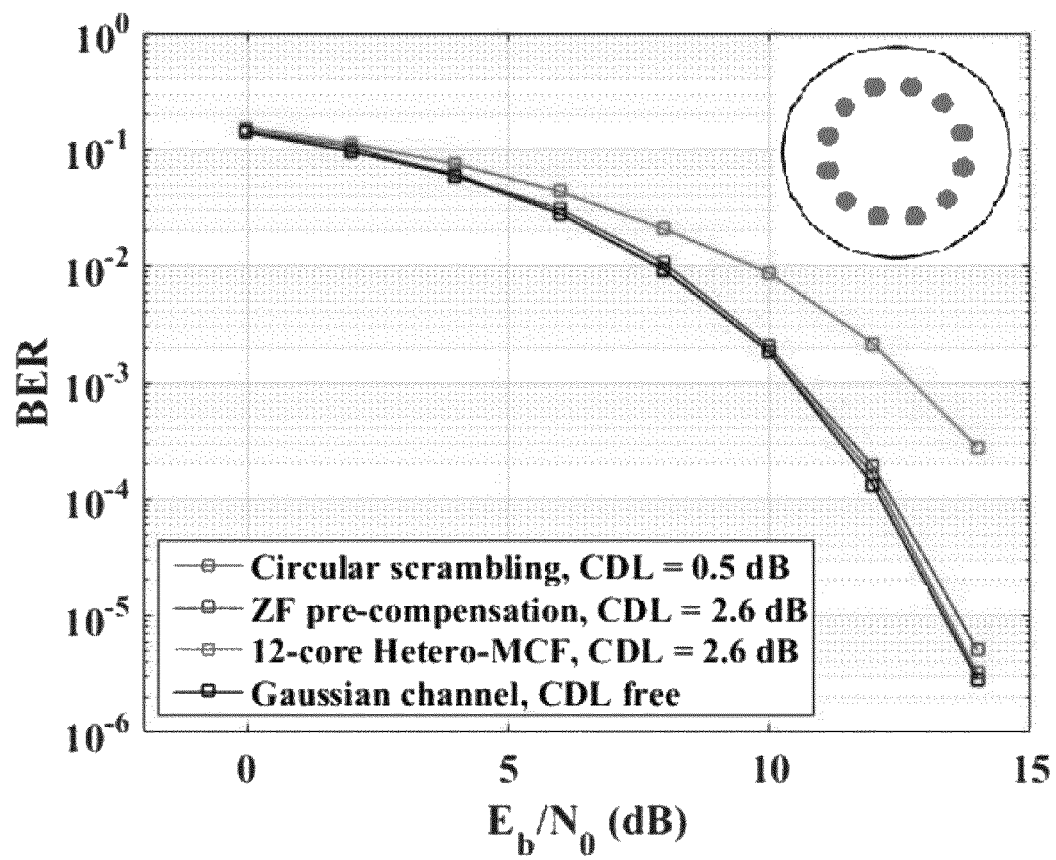
FIG. 14 illustrates the bit error rate performance as function of the signal-to-noise ratio obtained in a 12-core heterogeneous fiber, according to some embodiments of the invention.

FIG. 14 illustrates diagrams evaluating the bit error rate performance function of the signal-to-noise ratio obtained in a 12-core heterogeneous fiber for circular scrambling-based transmission system using one circular scrambler, ZF pre-compensation according to the embodiments of the invention, the Gaussian channel (CDL free), and the 12-core heterogeneous fiber without scrambling nor precoding. The use of one circular scrambler provides the optimal CDL reduction. Fibers of lengths 100 km (L=300 km) and 300 fiber sections (K=300) are considered. 16-QAM modulations are used in the optical transmitter and the ZF decoder is used at the optical receiver in the decoder 93. Numerical results show that ZF pre-compensation according to the embodiments of the invention mitigates the CDL impairments as the circular scrambling-based system. The ZF pre-compensation scheme approaches the performance of the Gaussian channel.

While the embodiments of the invention have been illustrated in application communication systems, the invention is not limited to communication applications and may be integrated in other applications such as data storage and medical imaging. The invention may be used in several optical transmission systems, for example automotive industry applications, in oil or gas markets, in aerospace and avionics sectors, sensing applications, etc.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. An optical transmitter for transmitting a vector of information symbols over an optical fiber transmission channel, said fiber transmission channel comprising a multi-core fiber, said vector of information symbols being carried by optical signals propagating along the multi-core fiber according to two or more cores, wherein the optical transmitter comprises a precoder configured to determine a precoding matrix depending on one or more fiber parameters associated with said multi-core fiber and to precode said vector of information symbols by multiplying the vector of information symbols by said precoding matrix, wherein the precoder is configured to determine a core loss value associated with each of said two or more cores depending on said fiber parameters and at least one misalignment loss value, each core loss value being a random variable of a lognormal distribution defined by a mean value and a variance value, said mean value and variance value being dependent on the fiber parameters and the at least one misalignment loss value.

2. The optical transmitter of claim 1, wherein the precoder is configured to:

determine a normalization factor as a ratio between a number of said two or more cores and a sum of the core loss values associated with said two or more cores;

determine, randomly, a first unitary matrix and a second unitary matrix;

determine a diagonal matrix comprising diagonal components, said diagonal components being equal to mean values of random variables defining core loss values associated with said two or more cores;

determine an auxiliary matrix as a product between a square root of the normalization factor, the first unitary matrix, the diagonal matrix, and the second unitary matrix;

the precoder being configured to determine said precoding matrix as an inverse of said auxiliary matrix.

3. The optical transmitter of claim 1, wherein said one or more fiber parameters comprise at least one parameter among a fiber length, a number of cores corresponding to the number of said two or more cores, at least one crosstalk coefficient, and at least one coupling coefficient, a crosstalk coefficient representing a crosstalk between two cores in the multi-core fiber, a coupling coefficient representing a coupling between two cores in the multi-core fiber.

4. The optical transmitter of claim 1, wherein said at least one misalignment loss value represent a misalignment of the multi-core fiber chosen in a group comprising a longitudinal misalignment, a transverse alignment, and an angular alignment.

5. The optical transmitter of claim 1, wherein the precoder is configured to determine each mean value of a core loss value associated with each core as a product between a first value and a second value, the first value corresponding to a mean of a lognormal random variable representing a total misalignment loss associated with said each core, the second value corresponding to a total crosstalk coefficient associated with said each core, the precoder being configured to determine the total crosstalk coefficient associated with a given core from the crosstalk coefficients representing the crosstalk between said given core and the cores of the multi-core fiber different from said given core, the precoder being further configured to determine the variance value of each core loss value associated with each core of the multi-core fiber as a product between a square of the total crosstalk coefficient associated with said each core and a third value corresponding to the variance of said lognormal random variable representing the total misalignment loss associated with said each core.

6. The optical transmitter of claim 1, wherein the optical transmitter further comprises:

an error correcting code encoder configured to encode said data into a codeword vector by applying at least one error correcting code;

a modulator configured to determine the vector of information symbols by applying a modulation scheme to said codeword vector.

7. An optical receiver configured to receive and decode the optical signals carrying data transmitted by an optical transmitter according to claim 1.

8. A method for transmitting a vector of information symbols over an optical fiber transmission channel made of a multi-core fiber, optical signals carrying said vector of information symbols propagating along the multi-core fiber according to two or more cores, wherein the method comprises:

determining a precoding matrix depending on one or more fiber parameters associated with said multi-core fiber and precoding said vector of information symbols by multiplying the vector of information symbols by said precoding matrix; and determining a core loss value associated with each of said two or more cores depending on fiber parameters and at least one misalignment loss value, each core loss value being a random variable of a lognormal distribution defined by a mean value and a variance value, said mean value and variance value being dependent on the fiber parameters and the at least one misalignment loss value.

9. The method of claim 8, further comprising:

determining a normalization factor as the ratio between a number of said two or more cores and a sum of the core loss values associated with said two or more cores;

randomly determining a first unitary matrix and a second unitary matrix;

determining a diagonal matrix comprising diagonal components, said diagonal components being equal to the mean values of the random variables defining the core loss values associated with said two or more cores;

determining an auxiliary matrix as a product between the normalization factor, the first unitary matrix, the diagonal matrix, and the second unitary matrix;

determining said precoding matrix as an inverse of said auxiliary matrix.

\* \* \* \* \*